US008922665B2

(12) United States Patent
Cooper et al.

(10) Patent No.: US 8,922,665 B2
(45) Date of Patent: Dec. 30, 2014

(54) RAPIDLY INITIALIZING AND DYNAMICALLY ADJUSTING MEDIA STREAMS

(75) Inventors: Stephen C. Cooper, Seattle, WA (US); Robert A. Farrow, Seattle, WA (US); Kurt D. Wrisley, Mukilteo, WA (US); Tolga Kilicli, Sammamish, WA (US); Walid Ali, Sammamish, WA (US); Shiwei Wang, Bellevue, WA (US); Kevin J. Smith, Redmond, WA (US); Kandarp Dinesh Jani, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 422 days.

(21) Appl. No.: 12/898,774

(22) Filed: Oct. 6, 2010

(65) Prior Publication Data

US 2012/0086815 A1  Apr. 12, 2012

(51) Int. Cl.
  *H04N 7/14* (2006.01)
  *H04N 5/232* (2006.01)
  *G06F 15/16* (2006.01)
  *H04L 29/06* (2006.01)
  *H04N 7/15* (2006.01)
  *H04N 21/2343* (2011.01)
  *H04N 21/234* (2011.01)
  *H04M 3/56* (2006.01)

(52) U.S. Cl.
  CPC ............. *H04N 7/15* (2013.01); *H04L 65/607* (2013.01); *H04L 65/602* (2013.01); *H04L 65/4092* (2013.01); *H04N 21/2343* (2013.01); *H04M 3/567* (2013.01); *H04N 21/23424* (2013.01)

USPC .............. 348/211.6; 348/14.12; 348/211.9; 709/231

(58) Field of Classification Search
  USPC .......... 348/14.12, 14.13, 207.1, 207.11, 348/211.4–211.6, 211.9, 211.12; 719/314; 709/221, 228, 231
  See application file for complete search history.

(56) References Cited

U.S. PATENT DOCUMENTS 7,692,683 B2    4/2010  Kenoyer et al.
7,870,562 B1 *  1/2011  Hansen-Sturm ............. 719/314

(Continued)

OTHER PUBLICATIONS

Bartlett, John; "Scalable Video Coding Solves Video Conferencing Scaling Issues"—Published Date: Apr. 6, 2010 http://www.nojitter.com/blog/archives/2010/04/scalable_video.html; jsessionid=PUFGED5CHYWVLQE1GHOSKHWATMY32JVN.

(Continued)

*Primary Examiner* — Daniel M Pasiewicz
(74) *Attorney, Agent, or Firm* — Tom Wong; Jim Ross; Micky Minhas

(57) ABSTRACT

A device may generate a media stream to be shared with other users by building a media graph, comprising a series of interconnected processing units that perform various processing tasks. However, the time involved in generating the media graph may delay the initialization of the media stream, and adjusting properties of the media stream (such as resolution or codec) may result in an interruption of the media stream while a new media graph is built. Instead, a media graph cache may be provided to cache a set of media graphs, which may be interchangeably selected for rapid initialization and adjusting of media stream properties. The media component (e.g., a video camera) may also be configured to promote rapid adjustments to some media stream properties, while maintaining other properties (e.g., field of view and white balance) for a smooth transition between media stream property sets.

19 Claims, 6 Drawing Sheets

(56) References Cited

U.S. PATENT DOCUMENTS

2008/0298278 A1* 12/2008 Thakkar et al. .............. 370/260
2009/0231415 A1 9/2009 Moore et al.
2009/0254577 A1* 10/2009 Balassanian et al. ......... 707/101
2010/0080287 A1 4/2010 Ali

OTHER PUBLICATIONS

Beier; et al., "GCSVA—A Multiparty Video conferencing System with Distributed Group and QoS Management"—Published Date: Oct. 1998, http://citeseerx.ist.psu.edu/viewdoc/download?doi=10.1.1.37.6138&rep=rep1&type=pdf.

Nee; et al., "The Performance of Two-Dimensional Media Scaling for Internet Videoconferencing"—Published Date: May 1997, http://www.cs.unc.edu/~jeffay/papers/NOSSDAV-97.pdf.

"Microsoft NetMeeting and Windows XP Video Conferencing via Messenger vs. CloudMeeting Real-Time Internet Conferencing"—Published Date: Jun. 3, 2004 http://www.cloudmeeting.com/en/infocenter/NetMeeting_vs._CloudMeeting_1.3.pdf.

Bhargava; et al., "Performance Studies for an Adaptable Video Conferencing System"—Published Date: 1996 http://citeseerx.ist.psu.edu/viewdoc/download?doi=10.1.1.50.9526&rep=rep1&type=pdf.

Samanta; et al., "Impact of Video Encoding Parameters on Dynamic Video Transcoding", Published—Jan. 8-12, 2006, http://ieeexplore.ieee.org/xpl/freeabs_all.jsp?arnumber=1665169&isnumber=34859.

* cited by examiner

RAPIDLY INITIALIZING AND DYNAMICALLY ADJUSTING MEDIA
STREAMS

BACKGROUND

Within the field of computing, many scenarios involve a media stream generated by a device and presented to a recipient, such as a videoconference involving a video stream that is generated by a device having a video camera and delivered over a communication network to devices operated by the other participants of the videoconference. In such scenarios, the device connected to the media stream may have a media graph architecture, comprising a set of interchangeable components that perform various tasks (e.g., communicating with the media component, compressing the media stream with a particular compression/decompression algorithm ("codec"), and encoding the media stream for streaming over a network). The device may initiate the generation of the media stream by selecting a set of components based on a desired set of media stream properties, and connecting the components in series to generate a media graph. The media component may then commence the capturing of the media stream, and the device may utilize the media graph to perform the processing of the media stream and the delivery to one or more recipients.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

While a media graph architecture may reduce the complexity involved in generating the media stream, several inadequacies may arise in some such architectures. As a first example, because the building of a media graph may involve initiating communication with one or more media components and allocating buffers in various memory locations, the process of initiating a media graph may be time-consuming, thereby delaying the initiation of the media stream by one or more seconds. As a second example, the architecture may not support adjustments of the media graph and/or media stream, and the media stream may have to be transformed based on various circumstances (e.g., a downsampling by the device to accommodate reduced network capacity between the device and the recipient, and/or a rescaling of the media stream to support the rendering capabilities of the device of the recipient). As a third example, one or more media components may be incapable of adjusting the media stream properties of the media stream without interrupting the generation of the media stream.

In order to improve the efficiency of the rendering process, the device and/or media components may be configured in particular ways. As a first example, instead of building media graphs in an ad hoc manner, the device may feature a media graph cache storing a set of media graphs, and may initiate or adjust a media stream with a new set of media stream properties by selecting a corresponding media graph from the media graph cache, thereby reducing the delays entailed by the building of the media graph. As a second example, instead of transforming a media stream (e.g., by resampling, re-compressing, or rescaling) to accommodate the capabilities of the device, the recipient, and/or a communication network therebetween, the architecture may permit a set of desired media stream properties to be communicated back to the media component in order to generate a suitable media stream. As a third example, media components may be configured to permit a rapid adjustment of the media stream without interrupting the generation or presentation thereof.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
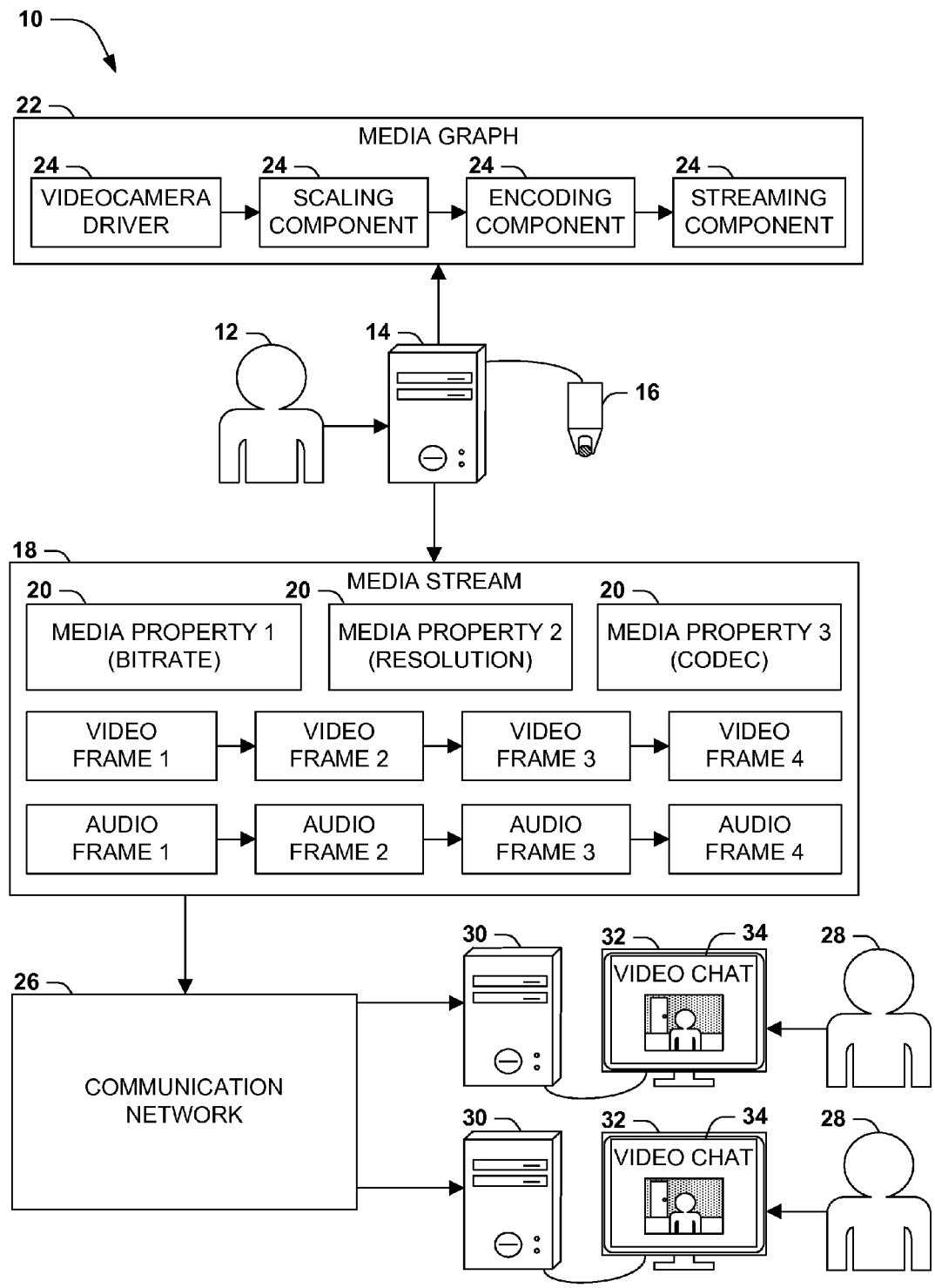
FIG. 1 presents an illustration of an exemplary scenario featuring a presentation of a media stream based on a media graph to a set of recipients.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

Within the field of computing, many scenarios involve the generation of a media stream from a media component of a device to be delivered to a recipient, such as a client accessible over a computer network. One such example involves a videoconference among a set of participating users who are connected via a network, where each user operates a device having a video camera that generates a video stream to be delivered to the other users for rendering by their devices as a video image. In such scenarios, the media stream is initiated with various media stream properties; e.g., a video stream may have a particular aspect ratio, field of view, horizontal and vertical resolution, color depth, and framerate, and may be compressed using one of several compression/decompression algorithms ("codecs"), each of which may have various properties such as lossy or lossless compression, error correction and recovery, and efficient or inefficient compression or decompression. In the case of a video stream generated by a video camera, various settings of the video camera may also be specified and/or automatically selected for the video stream, such as white balance, lens aperture size, and exposure length per frame.

The rendering of media may comprise a complex process with many stages and interrelationships. For example, in order to generate a video stream for delivery to a recipient, the device connected to the camera may have to initiate communication with a video camera and a microphone; send a request to begin capturing video and audio; allocate various buffers to store various frames of the video and audio; encode various frames of the video and audio with a compression algorithm; multiplex ("mux") the audio and video into a media stream; and handle the delivery of the media stream to the recipient (e.g., by storing and retransmitting lost or corrupted frames or packets). In order to reduce the complexity of these processes, the device may be configured to initiate the generation of the media stream using a "media graph," comprising a series of media processing components that perform various tasks. For example, the device may offer a first set of media graph components that allocate buffers in different memory locations, a second set of media graph components representing various codecs that may be used to encode video and/or audio, and a third set of media graph components that multiplex a set of streams into a composite stream in various ways. Utilizing this modular architecture, a media-based application (such as a videoconferencing application) executing on the device may build a media graph from a selection of such components, and may request the involved media components and the device to generate a media stream based on the processing path specified by the media graph.

FIG. 1 presents an illustration of an exemplary scenario 10 featuring a user 12 of a device 14 having a media component 16 (in this scenario, a video camera) and producing a media stream 18 on behalf of a set of recipients 28. The media stream 18 comprises a series of video frames and audio frames captured by the media component 16 that is streamed over a communication network 26 (such as a local area network (LAN), a wide area network (WAN) such as the internet, or a cellular communication network) and rendered within a media application 34 on a display 32 of a device 30 operated by each recipient 28. The media stream 18 is also generated with a set of media stream properties 20, such as a bit rate, a resolution (e.g., the number of pixels in the horizontal and vertical dimensions of each video frame), and a selected compression/decompression algorithm ("codec") that is used to compress the media stream 18 into an easily transmitted amount of data. In order to generate the media stream 18 according to the selected media stream properties 20, the device 14 of the user 12 generates a scene graph 22, comprising a series of processing components 24 that perform various tasks upon the data comprising the media stream 18. The device 14 may comprise a set of such processing components 24, such as a set of drivers for various media components 16; a set of scaling components that transform the content of the media stream 18, e.g., to achieve a particular horizontal or vertical size, aspect ratio, or bit depth; an encoding component that encodes the media stream 18 according to one or more codecs; and a streaming component that segments the data of the media stream 18 into a set of streamable packets. From the set of available processing components 24, the device 14 may generate a media graph 22 comprising a subset of such processing components 24 selected according to the media stream properties 20 and connected in a series to represent a computational pipeline for processing the frames of the media stream 18. In this manner, the device 14 may generate a media stream 18 for the recipients 28 that matches the specified media stream properties 20. Moreover, the modularity of the media graph architecture may permit the device 14 to generate media graphs 22 to meet new media stream properties 20 by adding new processing components 24 (e.g., a new encoding component representing a new codec having desirable properties).

While the use of a media graph architecture may reduce the complexity involved in the generation of media streams 18, several drawbacks may arise in some configurations. As a first example, the process of generating a media graph 22 for use in producing a media stream 18 may be comparatively lengthy; e.g., the allocation of memory buffers and the initiation of communication with each media component 16 involved in the production of the media stream 18 may take a significant amount of time, such as a full second, thereby delaying the commencement of the media stream 18 and delivery to the recipients 28 by a noticeable amount of time. As a second example, the media component 16 may be requested to generate the media stream 18 based on a particular set of media stream properties 20 that happen to be unsuitable for delivery to and rendering by one or more recipients 28. For example, the size of a media stream 18 may have to be adjusted to accommodate network bandwidth or the display size of the display 32 of the device 30 operated by the recipient 28. These adjustments are often achieved through a re-encoding of the media stream 18 (e.g., a downsampling of the media stream 18 by the device 14 of the user 12 for delivery to the recipient 28, or a rescaling of a video stream for rendering on the device 30 of the recipient 28). However, these adjustments may consume additional computing resources, such as processor and memory capacity and network bandwidth, due to the generation of the media stream 18 by the media component 16 according to an unsuitable set of media stream properties 20. As a third example, after the generation of the media stream 18 is initiated with a particular media graph 22, adjustment of the media stream 18 may be desirable (e.g., if network capacity of the communication network 26 between the device 14 and a recipient 28 changes; if the device 30 operated by the recipient 28 exhibits an increase or decrease in processing or battery capacity; or if the recipient 28 switches to a different device 30 having a different set of rendering capabilities). However, once the device 14 of the user 12 and/or media components 16 are programmed to generate a media stream 18 using a particular media graph 22, it may be difficult to adjust the media stream 18 (e.g., the bitrate, resolution, or codec) rapidly and without interrupting the generation of the media stream 18 and the presentation to the recipient(s) 28.

These disadvantages may be addressed by configuring the device 14 and/or the media components 16 in a manner that promotes the rapid initiation and adjustment of a media stream 18 based on a media graph 22. As a first example, the device 16 may be configured with a media graph cache that is configured to store a set of media graphs 22, each capable of generating a media stream 18 having a distinctive set of media stream properties 20, such as a specific bitrate and media quality. When the device 14 initiates the media stream 18, or when the device 14 later endeavors to adjust the media stream 18 in order to accommodate changing circumstances (such as bandwidth or processing power), the device 14 may select among the set of available media graphs 22 and may initiate the generation of the media stream 18 using the selected media graph 22, thereby avoiding a delay in the commencement of the media stream 18 while generating the media graph 22. As a second example, rather than adjusting the media stream 18 through re-encoding that may entail processing inefficiencies, a suitable set of media stream properties 20 may be communicated back to the media component 16, such that it may initially generate a media stream 18 having the suitable media stream properties 20. As a third example, the adjustment of the media stream 18 may be promoted by configuring media components 16 to support on-the-fly switching of the media stream properties 20 of the media stream 18, thereby providing a dynamic flexibility while reducing or avoiding an interruption of the media stream 18.

Figure 2:
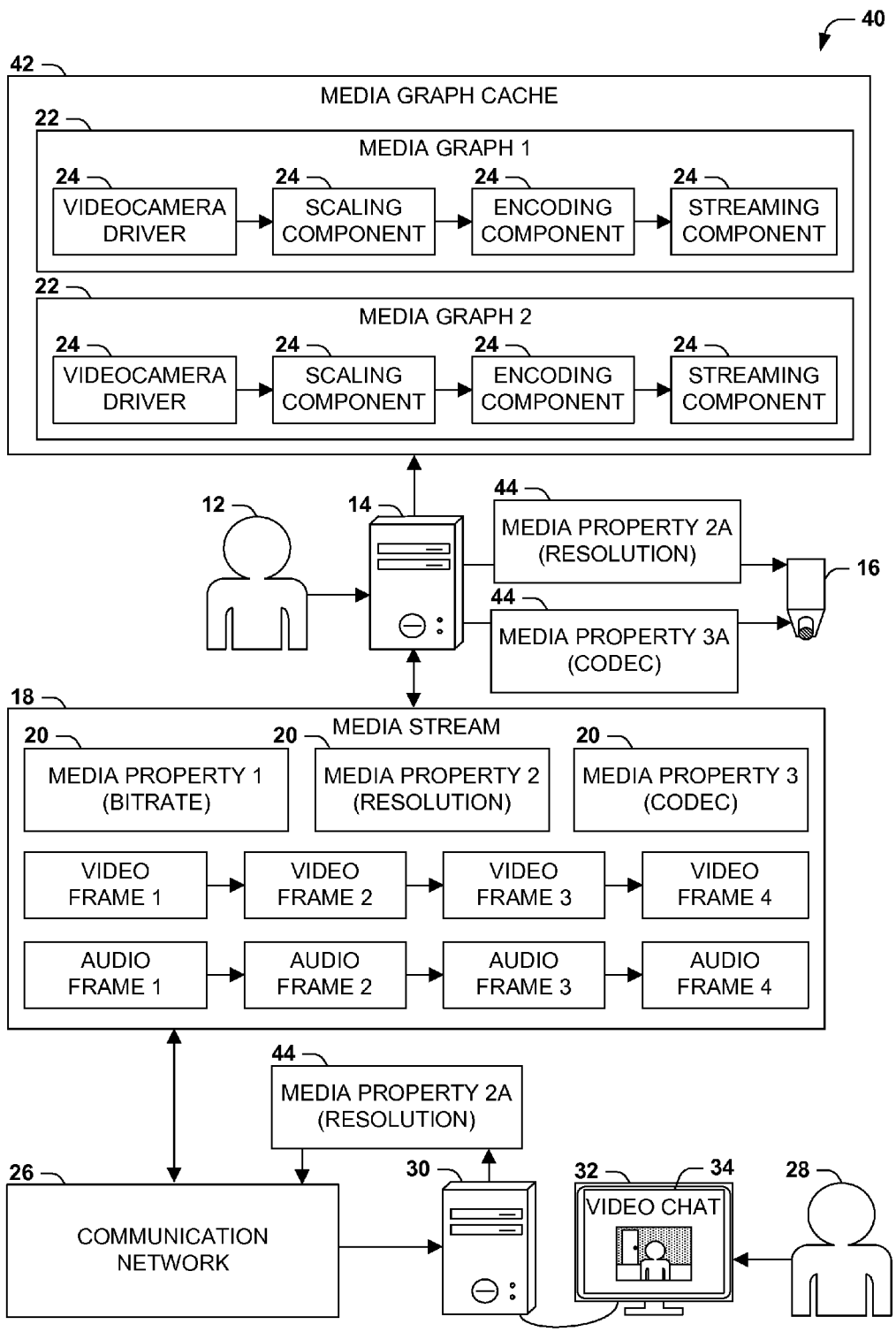
FIG. 2 presents an illustration of an exemplary scenario featuring a presentation of a media stream based on a media graph to a set of recipients in accordance with the present disclosure.

FIG. 2 presents an exemplary scenario 40 featuring the configuration of a device 14 and media component 16 according to these concepts in order to achieve improved initiation speed, adjustment, and processing efficiency of the media stream 18. In this exemplary scenario 40, the user 12 of a device 14 uses a media component 16 to generate a media stream 18 for delivery over a communication network 26 to a device 30 operated by a recipient 28. Initially, the media stream 18 has a set of media stream properties 20, such as bitrate, resolution, and codec. However, in this exemplary scenario 40, the device 14 also has a media graph cache 42 that is configured to store a set of media graphs 22. The media graph cache 42 may be prepopulated with a standard set of media graphs 22, such that the device 14 may retrieve a media graph 22 matching the initial set of media stream properties 20 and use this media graph 22 to initiate the media stream 18 much more rapidly than in the exemplary scenario 10 of FIG. 1. Alternatively, the media graphs 22 may be generated upon the initiation of the media stream 18.

The device 14 in the exemplary scenario 40 is also configured to promote an adjustment of the media stream properties 20 of the media stream 18 based upon various circumstances. For example, the device 14 may detect that the media stream 18 produced by the initial set of media stream properties 20 cannot be sufficiently delivered to the device 30 of the user 28 in view of low capacity of the communication network 26 (e.g., the device 14 may not have had sufficient bandwidth information upon selecting the initial set of media stream properties 20, or the bandwidth of the communication network 26 may have become reduced). Additionally, the device 30 of the recipient 28 may be rendering the media application 34 on the display 32 of the device 30 at a particular size. In many scenarios, including the exemplary scenario 10 of FIG. 1, the device 14 and/or communication component 16 may not be able to adjust these media stream properties 20, and the adjustments may be achieved by configuring the device 14 to recompress the media stream 18 with a different codec before transmitting it across the communication network 26, and by configuring the device 32 of the recipient 28 to downsample and rescale the media stream 18 according to the resolution of the media application 34. This additional processing may unduly consume the computing resources and capacities of each device and the communication network 26. Alternatively, the device 14 may generate a new media graph 22 to reflect these media stream properties 20, but the building of the media graph 22 and the configuration of the media component 26 may entail a delay and/or interruption of the media stream 18 of one or more seconds. However, in the exemplary scenario 40 of FIG. 2, the device 30 of the recipient 28 may communicate an adjusted media stream property 44 over the communication network 26 back to the device 14 of the user 12, where the adjusted media stream property 44 specifies the resolution of the media stream 18 to be rendered in the media application 34; and the device 14 identified an adjusted media stream property 44 indicating the alternative codec to be used in compressing the media stream 18. This information may be used to select an adjusted media graph having the adjusted media stream properties 44, and initiating an adjusted media stream 18 with the media component 16 using the altered media graph. Additionally, the media component 16 may be configured to support rapid switching of the media stream properties 20 of the media stream 18 (e.g., a rapid adoption and use of an adjusted media graph in place of an initial media graph 22), thereby permitting the rapid adjustment of the media stream 18 to reflect a suitable set of media stream properties 22 without an interruption or delay of the media stream 18. In this manner, the device 14 and/or media component 16 are configured to promote rapid initiation and/or adjustment of the media stream 18 through the use of the media graph cache 42; the propagation of adjusted media properties 44 from the device 30 of the recipient 28 back through the communication network 26 to the device 14 of the user 12 and to the media component 16; the selection of a suitable media graph 22 matching the adjusted media properties 44 from the media graph cache 42; and/or the configuration of the media component 16 to accept and apply adjusted media properties 44 while reducing or eliminating the delay or interruption of the media stream 18.

Figure 3:
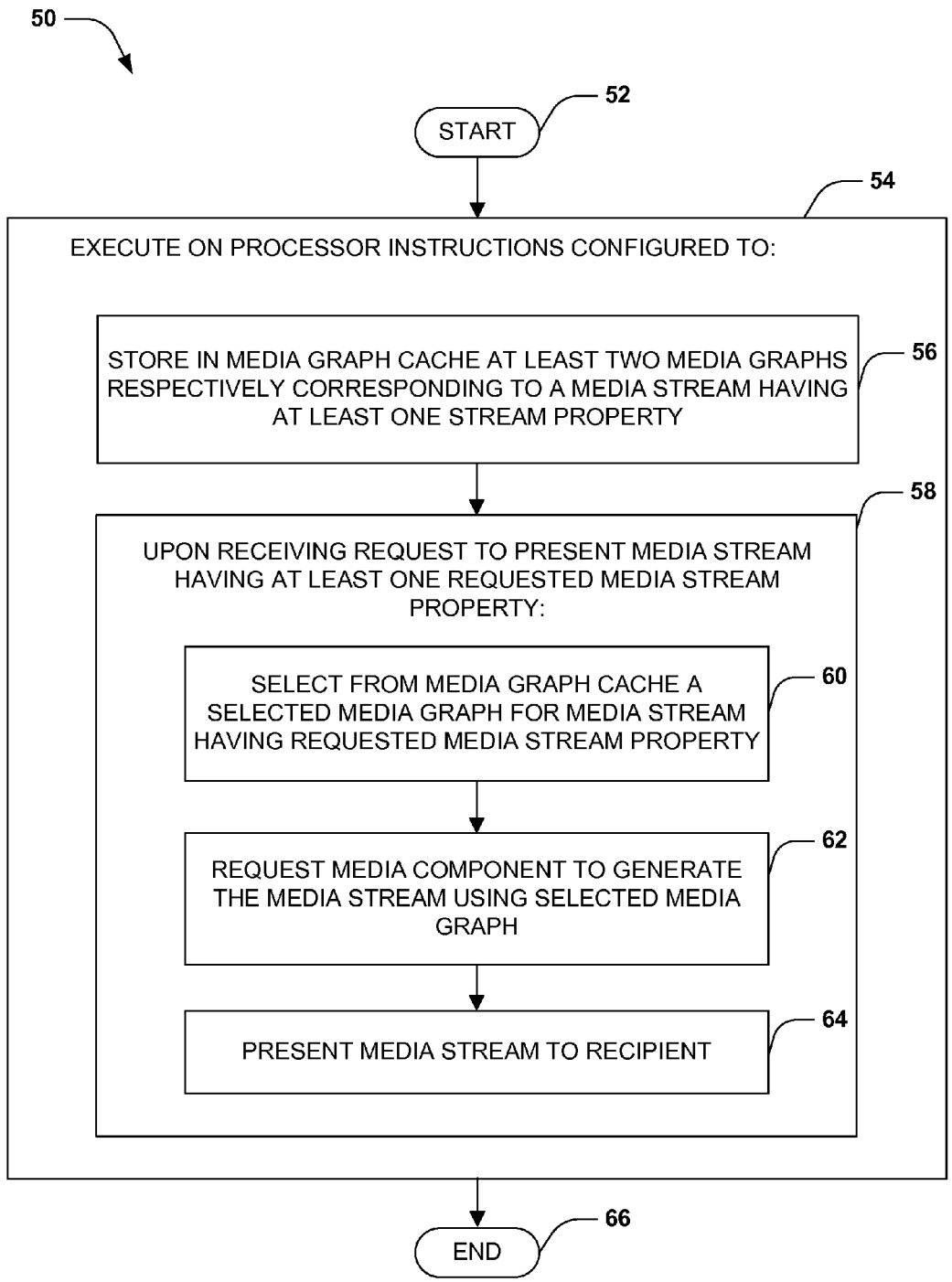
FIG. 3 is a flow diagram illustrating an exemplary method of presenting a media stream to at least one recipient.

FIG. 3 presents a first embodiment of these techniques, illustrated as an exemplary method 50 of presenting a media stream 18 generated by a media component 16 to at least one recipient 28 using a device 14 having a processor and a media graph cache 42. The exemplary method 50 may be implemented, e.g., as a set of processor-executable instructions stored in a volatile or nonvolatile memory component of the device 14 (e.g., system memory, a hard disk drive, a solid-state storage component, or a magnetic or optical disc). The exemplary method 50 begins at 52 and involves executing 54 on the processor instructions configured to perform the techniques presented herein. In particular, the instructions are configured to store 56 in the media graph cache 42 at least two media graphs 22 respectively corresponding to a media stream 18 having at least one media stream property 20. The instructions are also configured to, upon receiving 58 a request to present the media stream 18 having at least one requested media stream property 20, select 60 from the media graph cache 42 a selected media graph for a media stream 18 having the requested media stream properties 20; request 62 the media component 16 to generate the media stream 18 using the selected media graph 22; and present 64 the media stream 18 to the recipient 28. Having achieved the generation of the media stream 18 using the media graphs 22 stored in the media graph cache 42, the exemplary method 50 thereby achieves a rapid initiation of the media stream 18 for delivery to the recipient 28, and so ends at 66.

Figure 4:
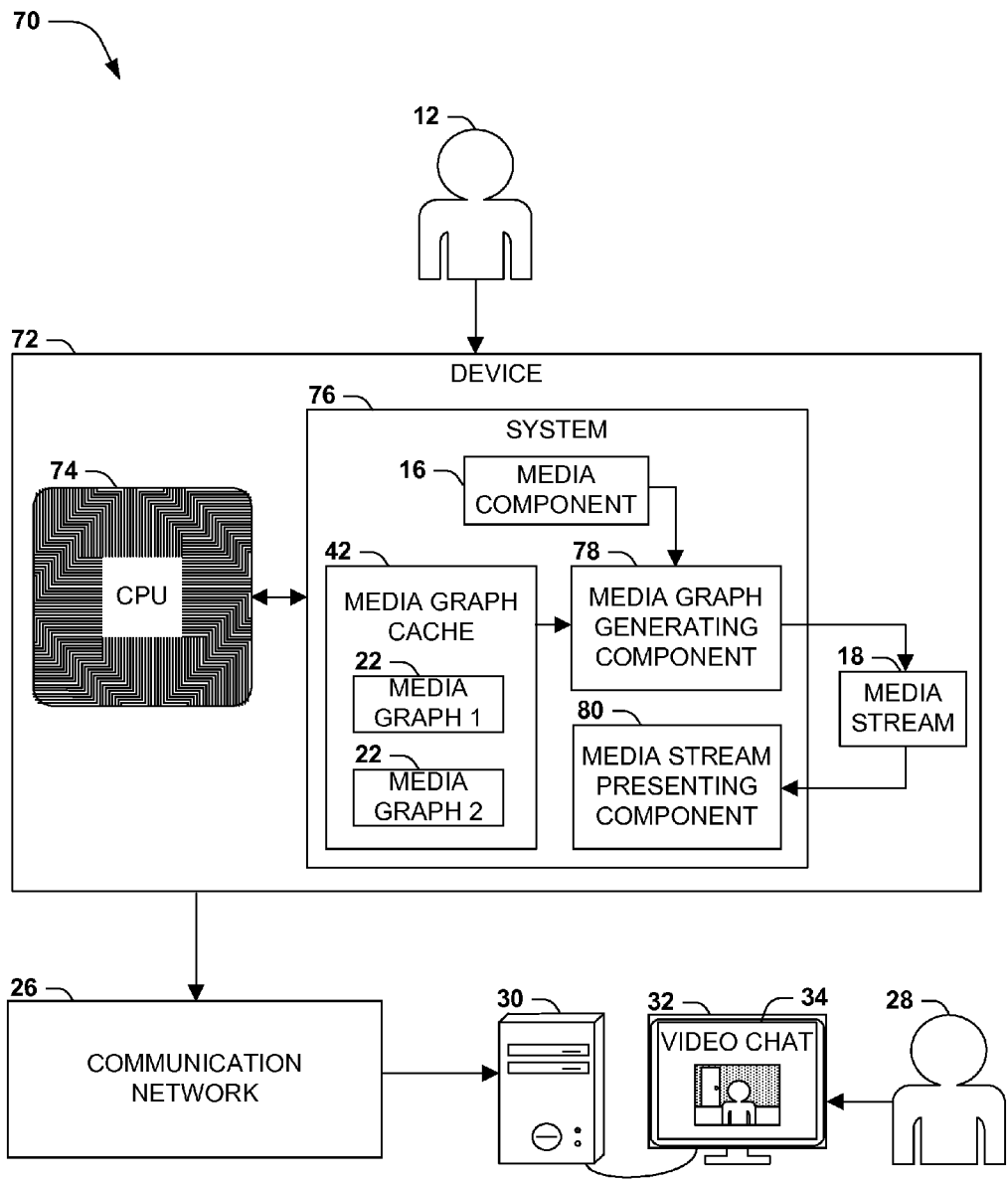
FIG. 4 is a component block diagram illustrating an exemplary system for presenting a media stream to at least one recipient.

FIG. 4 presents an illustration of an exemplary scenario 70 featuring a second embodiment of these techniques, presented herein as an exemplary system 76 operating within a device 72 having a processor 74. The exemplary scenario 70 involves the generation of a media stream 18 generated by a user 12 of the device 72 that is to be presented via a communication network 26 to a device 30 operated by a recipient 28. The various components of the system 76 may comprise, e.g., hardware or software components that perform various tasks, and that are interconnected as an architecture that operates according to the techniques presented herein. The exemplary system 72 comprises a media component 16 configured to generate the media stream 18 (e.g., a video camera, a still camera, a microphone, or a storage component storing media to be rendered as a stream). The exemplary system 76 also comprises a media graph cache 42 that is configured to store at least two media graphs 22, and a media graph generating component 78 that is configured to store in the media graph cache 42 at least two media graphs 22 respectively corresponding to a media stream 18 having at least one media stream property 20. The exemplary system 76 also comprises a media stream presenting component 80, which is configured to, upon receiving a request to present a media stream 18 having at least one requested media stream property 20, select from the media graph cache 42 a selected media graph for a media stream 18 having the requested media stream property 20; request the media component 16 to generate the media stream 18 using the selected media graph; and present the media stream 18 to the recipient 28. In this manner, the components and architecture of the exemplary system 76 cause the device 72 to generate a media stream 18 rapidly using the media graphs 22 stored in the media graph cache 42 according to the techniques presented herein.

Figure 5:
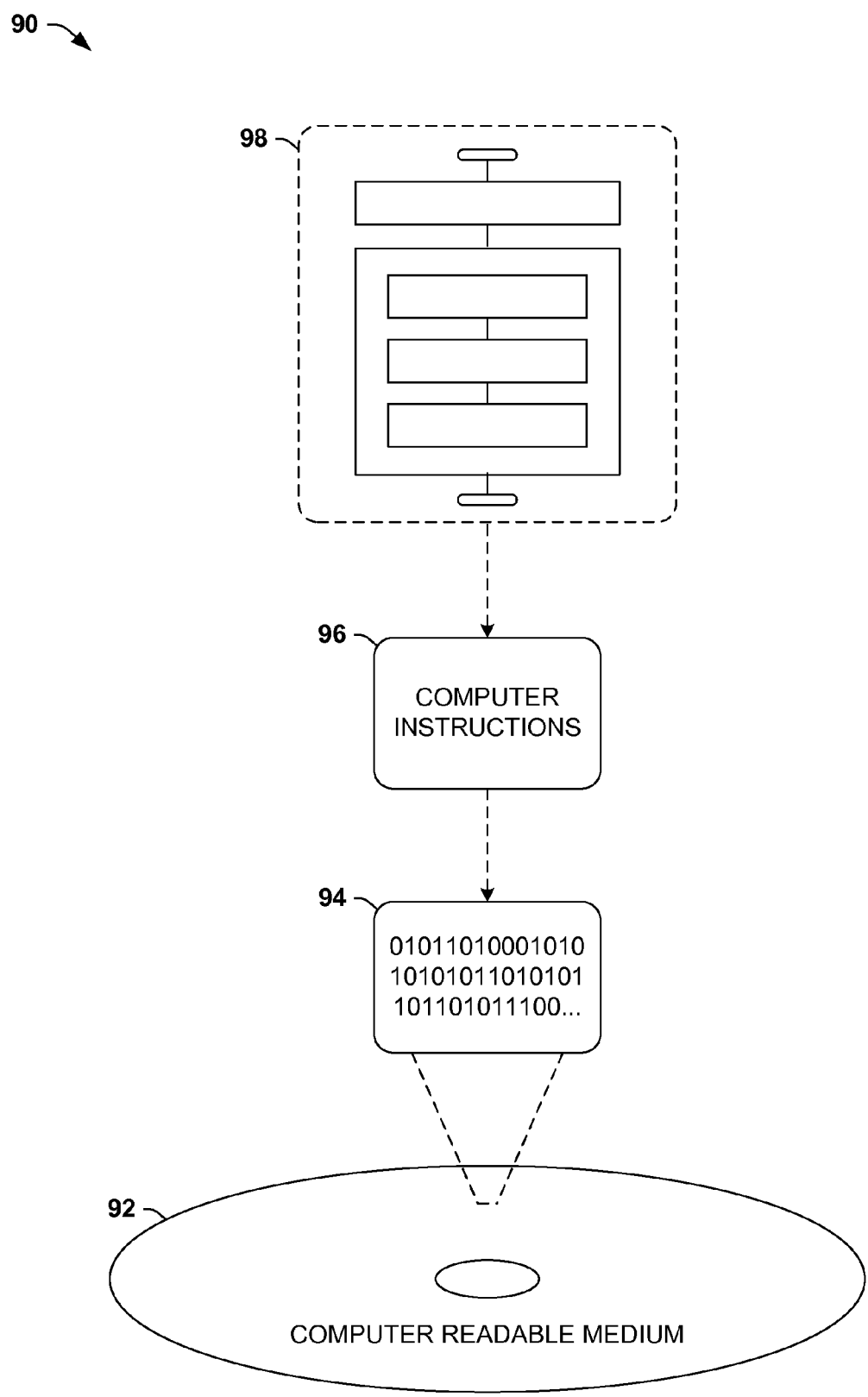
FIG. 5 is an illustration of an exemplary computer-readable medium comprising processor-executable instructions configured to embody one or more of the provisions set forth herein.

Still another embodiment involves a computer-readable medium comprising processor-executable instructions configured to apply the techniques presented herein. An exemplary computer-readable medium that may be devised in these ways is illustrated in FIG. 5, wherein the implementation 90 comprises a computer-readable medium 92 (e.g., a CD-R, DVD-R, or a platter of a hard disk drive), on which is encoded computer-readable data 94. This computer-readable data 94 in turn comprises a set of computer instructions 96 configured to operate according to the principles set forth herein. In one such embodiment, the processor-executable instructions 96 may be configured to perform a method of presenting a media stream to at least one recipient, such as the exemplary method 50 of FIG. 3. In another such embodiment, the processor-executable instructions 96 may be configured to implement a system for presenting a media stream to at least one recipient, such as the exemplary system 76 of FIG. 4. Some embodiments of this computer-readable medium may comprise a nontransitory computer-readable storage medium (e.g., a hard disk drive, an optical disc, or a flash memory device) that is configured to store processor-executable instructions configured in this manner. Many such computer-readable media may be devised by those of ordinary skill in the art that are configured to operate in accordance with the techniques presented herein.

The techniques discussed herein may be devised with variations in many aspects, and some variations may present additional advantages and/or reduce disadvantages with respect to other variations of these and other techniques. Moreover, some variations may be implemented in combination, and some combinations may feature additional advantages and/or reduced disadvantages through synergistic cooperation. The variations may be incorporated in various embodiments (e.g., the exemplary method 50 of FIG. 3 and the exemplary system 76 of FIG. 4) to confer individual and/or synergistic advantages upon such embodiments.

A first aspect that may vary among embodiments of these techniques relates to the scenarios wherein such techniques may be utilized. As a first example, many types of media components 16 may be used to generate many types of media streams 18, such as a video camera configured to generate a video stream; a still camera configured to generate an image stream; a microphone configured to generate an audio stream; and a storage device storing one or more media documents and configured to generate a content stream therefrom. As a second example, the media stream 18 may be consumed by the recipient 28 in many types of streaming media applications, including bidirectional streaming media applications (e.g., a text, audio, video, or multimedia conference) and unidirectional streaming media applications (e.g., a one-way video stream shared with recipients 28 over a communication network 26). Alternatively or additionally, the media stream 18 may be consumed directly by the device 14 of the user 12 (serving also as a recipient 28), e.g., to render the media stream 18 on a display of the device 14 of the user 12. As a third example of this first aspect, the media stream 18 may be generated and delivered to one recipient 28 or to a plurality of recipients 28, which may involve, e.g., concurrently generating multiple media streams 18 to be delivered to different recipients 28, generating one media stream 18 to be delivered to all recipients 28, or utilizing proxies, multicasting, and/or peer-to-peer network techniques to deliver the media stream(s) 18 to the recipients 28.

As a fourth example of this first aspect, the media stream properties 20 may specify many aspects of the media stream 18; e.g., the media stream properties 20 may be selected from a media stream property set comprising a media stream bitrate (e.g., a target data size or data rate of the media stream 18); a media stream framerate (e.g., the sampling frequency of a microphone or the framerate of a video stream); a media stream frame size (e.g., the horizontal or vertical dimensions of the frames in a video stream, or the dynamic range of audio in an audio stream); a media stream quality indicator (e.g., the resolution or color depth of a video frame, or the sampling precision of an audio stream); and a media stream codec used to compress the media stream 18 (e.g., a more lossy or processor-intensive codec may produce a smaller media stream 18, while a less lossy or processor-intensive codec may produce a larger media stream 18). Those of ordinary skill in the art may devise many scenarios where the techniques presented herein may be utilized.

A second aspect that may vary among embodiments of these techniques relates to the manner of selecting the media stream properties 20 of a media stream 18, which are used to select a media graph 22 capable of generating media streams 18 having such media stream properties 20. As a first example, the media stream properties 20 may be selected based on many factors. In a first such variation, the media stream properties 20 may be based on the media stream processing capabilities of the device 14, such as available memory for receiving the media stream 18 from the media component 16, available processor capacity to process the media stream 18, and available bus capacity to deliver the media stream 18 to a transmitter, such as a network adapter. In a second such variation, where the device 14 of the user 12 and the recipient 28 are connected via a communication network 26, the media stream properties 20 may be based on various communication network properties of the communication network 26, such as upload capacity to receive the media stream 18 from the device 14, download capacity to deliver the media stream 18 to the recipient 28, the latency involved in the delivery of the media stream 18, and the availability of network proxies that may rebroadcast the media stream 18 on behalf of the user 14. In a third such variation, the media stream properties 20 may be based on the media stream rendering capabilities of the recipient 28, such as the display capabilities (e.g., horizontal and vertical dimensions, pixel depth, color depth, and framerate) of a display 32 attached to the device 30 of the recipient 28.

As a second example of this second aspect, media stream properties 20 may be selected, e.g., as an initial set of media stream properties 20 while initiating the media stream 18. Alternatively, media stream properties 20 may be selected as an adjusted set of media stream properties 20 in order to adjust the properties of a media stream 18 that is already being delivered to one or more recipients 28. This adjustment may be based upon detection of various properties of the processing capabilities of the device 14 of the user 12; of network capabilities of a communication network 26 connecting the device 14 to the recipient 28; and/or of rendering capabilities of a device 30 operated by the recipient 28, where such properties differ from presumed or inferred properties whereby an initial set of media stream properties 20 are selected, and/or from previous detections of the same properties. For example, a recipient 28 may resize a window of a media application 34, thereby resulting in different dimensions of a video stream rendered therein, or may switch to a different device 30 that has different rendering capabilities (e.g., during a videoconference, the recipient 28 may switch from a desktop computer having a large display 32 to a mobile phone device having a small display 32), and the device 14 and/or media component 16 may adjust the media stream properties 20 of the media stream 18 in response to the adjusted media stream rendering properties of the device 30 of the recipient 28. In such scenarios, after presenting the media stream 18 to one or more recipients 28 with an initial set of media stream properties 20, the device 14 may receive an adjusting request to present the media stream 18 having one or more adjusted media stream properties, e.g., an adjusted bitrate, framerate, or resolution. The device 14 may therefore select from the media graph cache 42 an adjusted media graph for a media stream 18 having the one or more adjusted media stream properties; may request the media component 16 to generate an adjusted media stream having the adjusted media stream property and using the adjusted media graph; and may present the adjusted media stream to the recipient 28. Those of ordinary skill in the art may devise many ways of selecting media stream properties 20 according to the capabilities of the device 14 of the user 12, the device 30 of the recipient 28, and/or the communication network 26 therebetween while implementing the techniques presented herein.

A third aspect that may vary among embodiments of these techniques relates to the configuration and use of the media graph cache 42. As a first example, the media graph cache 42 may be populated with media graphs 22 at various times in the operation of these techniques. In a first such variation, the media graph cache 42 may be prepopulated with a standard set of media graphs 22 (e.g., storing at least two media graphs 22 in the media graph cache 24 before receiving a request to present a media stream 18), which may be available for selection when the request to generate a media stream 18 is received. While this variation may be advantageous for promoting a rapid initiation of the media stream 18, it may be inefficient to maintain a set of media graphs 22, each of which may involve an allocation of buffers in various portions of memory, the reservation of resources of various processing components 24, and/or the establishment of a communication channel with one or more media components 16. In a second such variation, the device 14 may generate various media graphs 22 and store the media graphs 22 in the media graph cache 24 upon receiving the request to present the media stream 18. For example, when the device 14 receives a request from a recipient 28 to generate the media stream 18, the device 14 may build a first media graph 22 based on an initial set of media graph properties 20 in order to initiate the media stream 18, but may then proceed to build several more media graphs 22 for storage in the media graph cache 42. While this variation may front-load the computational burden of generating media graphs 22 (some or all of which may not be used during the media stream 18), this variation may allow subsequent requests to adjust the media stream properties 20 of the media stream 18 to be quickly and efficiently handled, thereby reducing or eliminating interruptions of the media stream 20. Additionally, it may be advantageous to generate and store the set of available media graphs 22 upon receiving the request to generate the media stream 18, but to defer the generation of media graphs 22 until a low utilization period of the processor 74 of the device is detected (e.g., generating the extra media graphs 22 during periods of idle processor time).

As a third variation of this first example of this third aspect, media graphs 22 may be generated on an ad hoc basis (e.g., when a media stream 18 having a particular set of media stream properties 20 is requested), but may be stored in the media graph cache 42 for future use, in case the media stream 18 is subsequently altered to adopt the media stream properties 20 associated with a previously used media graph 22. For example, a media stream 18 may be initiated with a first set of media stream properties 20 that result in the ad hoc generation of a first media graph 22, but may subsequently be altered to result in the ad hoc generation of an adjusted media graph associated with a set of adjusted media stream properties. However, if the first media graph 22 is stored in the media graph cache 42 upon switching to the adjusted media graph, the first media graph 22 may later be reused following a request to revert to the initial set of media stream properties 20 (e.g., if bandwidth is initially copious, temporarily restricted, and subsequently restored). Accordingly, the device 14 may be configured to, upon receiving a request to present a media stream 18 having at least one requested media stream property 20, examine the media graph cache 42 to identify a media graph 22 for a media stream 18 having the requested media stream property 20; and to, upon failing to locate the media graph 22 in the media graph cache 42, generate the media graph 22 and store the media graph 22 in the media graph cache 42. This variation in the use of the media graph cache 42 may therefore promote the re-use of media graphs 22 and may avoid inefficient teardown and rebuilding of media graphs 22 that are repeatedly used to generate the media stream 18.

A fourth example of this third aspect relates to the configuration of the media graph cache 42 to release media graphs 22 that are no longer useful. While many architectures that use media graphs 22 tend to maintain the media graph 22 through the life of the media stream 18 and then release the resources associated therewith, the releasing precludes the re-use of the media graph 22 through the use of the media graph cache 42, and may take additional time and resources that may be undesirably performed during the streaming of the media stream 18. Accordingly, and as a first variation of this fourth example, the media graph cache 42 may simply be configured not to release any media graphs 22, which may be helpful, e.g., where the media graph cache 42 is pre-populated with a standard set of media graphs 22. As a second variation of this fourth example, the media graph cache 42 may be configured to, upon detecting a termination of the media stream 18, release some or all of the media graphs 22 stored in the media graph cache 42. As a third variation of this fourth example, the media graph cache 42 may examine the set of stored media graphs 22 and may identify and release expendable media graphs, e.g., media graphs 22 that are not likely to be used again, or that are inexpensive to regenerate. For example, the media graph cache 42 may retain a set of twenty recently-used media graphs 22, and, upon generating a new media graph 22 to be added to the media graph cache 42, may release the least-recently-used media graph 22 in this set. In this manner, the media graph cache 42 may cull the set of stored media graphs 22 in order to achieve a suitable balance between the re-use of media graphs 22 and the inefficient resource allocations involved in maintaining a large set of media graphs 22. Those of ordinary skill in the art may devise many configurations of the media graph cache 42 while implementing the techniques presented herein.

A fourth aspect that may vary among embodiments of these techniques relates to the manner of configuring the media component 16 to support the adjustment of the media stream 18. As a first example, the media component 16 may be configured to, upon receiving an adjusting request to generate an adjusted media stream having an adjusted media stream property, generate the adjusted media stream having the adjusted media stream property. Furthermore, the media component 16 may be configured to support the switching from a first media graph to a second media graph quickly and while minimizing or eliminating a perceived interruption of the media stream 18. For example, the media component 16 may be configured to, after receiving the adjusting request, generate the adjusted media stream within an adjustment threshold period, e.g., within 300 milliseconds of receiving the adjusting request. (It may not be difficult to configure the media component 16 to enable this capability; however, the utility of doing so may only have been appreciated upon identifying the scenarios described herein, and in furtherance of the advantages provided by the techniques presented herein.)

As a second example of this fourth aspect, the media component 16 may constrain the set of adjusted media stream properties that may be accepted and applied to achieve an adjustment of an existing media stream 18. Such constraints may be advantageous, e.g., for reducing the perceptible transition between a first media stream 18 (based on a first media graph 22) and an adjusted media stream (based on an adjusted media graph); e.g., while the quality of the media stream 18 may appear to change, other properties of the media stream 18 may be maintained. For example, if the media stream 18 comprises a video stream and the media component 16 comprises a video camera, some optical and video properties of the video stream may not be adjustable in view of changing processing, network, and/or rendering capabilities, but may be maintained through adjustments of the video stream, while other media stream properties 20 may be adjusted. In a first such variation, the video stream may have an aspect ratio (e.g., a ratio of the width of respective frames of the video stream to the height of respective frames of the video stream), and/or a field of view (e.g., a focal point, zoom level, and peripheral boundaries of the image captured by the video camera). In order to reduce the perceptibility of adjustments to the quality of the video stream, these properties may be maintained, such that the adjusted video stream has the same aspect ratio and field of view as the initial video stream, even if other properties (e.g., resolution or codec) are adjusted. In a second such variation, the video camera may have one or more camera properties, such as the focal depth, white balance, aperture, shutter speed, and exposure length per frame. The video camera may also be configured to maintain these camera properties while switching from an initial video stream to an adjusted video stream, thereby reducing the perceptibility of adjustments to other video stream properties of the video stream. Those of ordinary skill in the art may devise various ways of configuring one or more media components 16 to support the capabilities of the device 14 while implementing the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Figure 6:
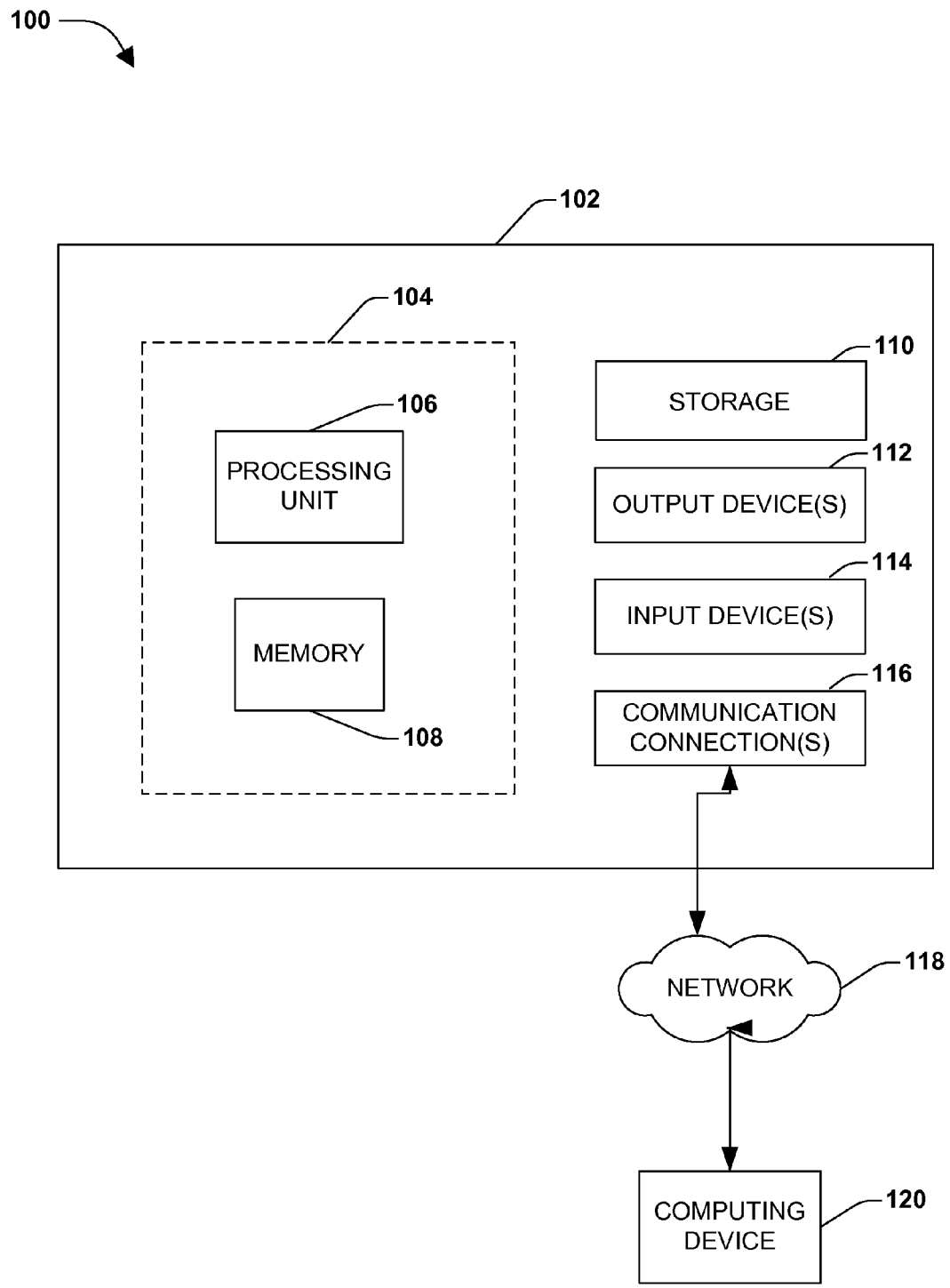
FIG. 6 illustrates an exemplary computing environment wherein one or more of the provisions set forth herein may be implemented.

FIG. 6 and the following discussion provide a brief, general description of a suitable computing environment to implement embodiments of one or more of the provisions set forth herein. The operating environment of FIG. 6 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, recipient electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 6 illustrates an example of a system 100 comprising a computing device 102 configured to implement one or more embodiments provided herein. In one configuration, computing device 102 includes at least one processing unit 106 and memory 108. Depending on the exact configuration and type of computing device, memory 108 may be volatile (such as RAM, for example), non-volatile (such as ROM, flash memory, etc., for example) or some combination of the two. This configuration is illustrated in FIG. 6 by dashed line 104.

In other embodiments, device 102 may include additional features and/or functionality. For example, device 102 may also include additional storage (e.g., removable and/or non-removable) including, but not limited to, magnetic storage, optical storage, and the like. Such additional storage is illustrated in FIG. 6 by storage 110. In one embodiment, computer readable instructions to implement one or more embodiments provided herein may be in storage 110. Storage 110 may also store other computer readable instructions to implement an operating system, an application program, and the like. Computer readable instructions may be loaded in memory 108 for execution by processing unit 106, for example.

The term "computer readable media" as used herein includes computer storage media. Computer storage media includes volatile and nonvolatile, removable and non-removable media implemented in any method or technology for storage of information such as computer readable instructions or other data. Memory 108 and storage 110 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 102. Any such computer storage media may be part of device 102.

Device 102 may also include communication connection(s) 116 that allows device 102 to communicate with other devices. Communication connection(s) 116 may include, but is not limited to, a modem, a Network Interface Card (NIC), an integrated network interface, a radio frequency transmitter/receiver, an infrared port, a USB connection, or other interfaces for connecting computing device 102 to other computing devices. Communication connection(s) 116 may include a wired connection or a wireless connection. Communication connection(s) 116 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 102 may include input device(s) 114 such as keyboard, mouse, pen, voice input device, touch input device, infrared cameras, video input devices, and/or any other input device. Output device(s) 112 such as one or more displays, speakers, printers, and/or any other output device may also be included in device 102. Input device(s) 114 and output device(s) 112 may be connected to device 102 via a wired connection, wireless connection, or any combination thereof. In one embodiment, an input device or an output device from another computing device may be used as input device(s) 114 or output device(s) 112 for computing device 102.

Components of computing device 102 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 102 may be interconnected by a network. For example, memory 108 may be comprised of multiple physical memory units located in different physical locations interconnected by a network.

Those skilled in the art will realize that storage devices utilized to store computer readable instructions may be distributed across a network. For example, a computing device 120 accessible via network 118 may store computer readable instructions to implement one or more embodiments provided herein. Computing device 102 may access computing device 120 and download a part or all of the computer readable instructions for execution. Alternatively, computing device 102 may download pieces of the computer readable instructions, as needed, or some instructions may be executed at computing device 102 and some at computing device 120.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method of presenting a media stream on a device having a processor, a set of media components, a media output device, and a media graph cache, the method comprising:

executing on the processor instructions that cause the device to:

upon receiving a first request to present a first media stream having at least one requested media stream property:

generate a media graph comprising a set of selected media components and including a preparation of the media output device to present media streams having the requested at least one media stream property;

request the respective media components to present the first media stream using the media graph; and store the media graph in the media graph cache;

upon completing presenting the first media stream, maintain the preparation of the media output device to present media streams having the requested at least one media stream property; and upon receiving a second request to present a second media stream having the at least one requested media stream property:
- select the media graph from the media graph cache; and
- request the media component to present the second media stream using the media graph, including reusing the preparation of the media output device to present the second media stream.

2. The method of claim 1, the at least one media stream property selected from a media stream property set comprising:
- a media stream bitrate;
- a media stream framerate;
- a media stream frame size;
- a media stream quality indicator; and
- a media stream codec used to compress the media stream.

3. The method of claim 1, the at least one requested media stream property selected according to a media stream processing capability of the device.

4. The method of claim 1:
- the media stream received by the device via a communication network; and
- the at least one requested media stream property selected according to at least one communication network property of the communication network.

5. The method of claim 1, the at least one requested media stream property selected according to a media stream rendering capability of the device.

6. The method of claim 1, comprising: upon receiving, after initiating presenting the media stream, an adjusting request to present the media stream having at least one adjusted media stream property:
- select from the media graph cache an adjusted media graph for a media stream having the adjusted media stream property;
- request the media component to generate an adjusted media stream having the adjusted media stream property and using the adjusted media graph; and
- present the adjusted media stream.

7. The method of claim 6, the adjusting request initiated according to an adjusted media stream rendering capability of the device.

8. The method of claim 1, the instructions further configured to, upon detecting a low utilization period of the processor:
- generate a media graph for media streams having at least one media stream property, and
- storing the media graph in the media graph cache.

9. The method of claim 1, comprising:
- examining the media graph cache to identify at least one expendable media graph; and
- upon identifying at least one expendable media graph:
  - removing the expendable media graph from the media graph cache, and
  - releasing the expendable media graph.

10. The method of claim 1, wherein:
- the preparation of the media output device further comprises: requesting the media output device to allocate a buffer used while presenting media streams having the requested at least one media stream property; and
- maintaining the preparation of the media output device further comprises: maintaining the buffer of the media output device after completing presenting the first media stream.

11. A system for presenting a media stream to at least one recipient using a device having a processor, a set of media components, and a media graph cache, the system comprising:
- a media graph cache configured to store a set of media graphs respectively comprising a set of selected media components organized to rendering a media stream; and
- a media stream presenting component configured to:
  - before receiving a request to present a media stream having at least one media stream property:
    - generate a media graph comprising a set of selected media components organized to render media streams having the at least one media stream property; and
    - store the media graph in the media graph cache; and
  - upon receiving a request to present a requested media stream having a requested media stream property:
    - select, from the media graph cache, a selected media graph that is organized to render media streams having the requested media stream property; and
    - invoke the selected media graph to present the requested media stream to the recipient.

12. The system of claim 11, the media component configured to, upon receiving an adjusting request to generate an adjusted media stream having an adjusted media stream property, generate the adjusted media stream having the adjusted media stream property.

13. The system of claim 12, the media presenting component configured to generate the adjusted media stream within an adjustment threshold period after receiving the adjusting request.

14. The system of claim 11:
- the media stream comprising a video stream; and
- the media component comprising a videocamera configured to produce the video stream.

15. The system of claim 14, the videocamera configured to:
- generate a video stream having an aspect ratio and a field of view; and
- upon receiving an adjusting request to generate an adjusted video stream having an adjusted video stream property, generate the adjusted video stream having the adjusted video stream property and having the aspect ratio and the field of view.

16. The system of claim 14, the videocamera configured to:
- generate a video stream using at least one camera property; and
- upon receiving an adjusting request to generate an adjusted video stream having an adjusted video stream property, generate the adjusted video stream having the adjusted video stream property and using the camera property.

17. A memory device storing instructions that, when executed on a processor of a device having a set of media components and a media graph cache, present a media stream by:
- upon receiving a request to present a media stream having a first media stream property:
  - generating a first media graph for media streams having a first media stream property, the media graph comprising a mapping of media components capable of rendering a media stream;
  - invoking the first media graph to present the media stream using the first media graph and the first media stream property;
  - generating a second media graph for media streams having a second media stream property that is mutually exclusive with the first media stream property; and storing the first media graph and the second media graph in the media graph cache; and upon receiving an adjusting request, while presenting the media stream, to adjust presenting the media stream from the first media stream property to the second media stream property:
- selecting the second media graph from the media graph cache; and
- invoking the second media graph to present the media stream using the second media stream property.

18. The memory device of claim 17, wherein:
the first media stream property is selected in accordance with an initial media stream rendering capability of the device;
the first media stream property is selected in accordance with an adjusted media stream rendering capability of the device that is different from the initial media stream rendering capability;
invoking the first media graph further comprises: invoking the first media graph to initiate presenting the media stream using the first media graph and the first media stream property in accordance with the initial media stream rendering capability of the device; and
receiving the adjusting request further comprises: receiving the adjusting request reflecting an adjustment of the device from the initial media stream rendering capability to the adjusted media stream rendering capability.

19. The memory device of claim 17, wherein:
the adjusting request is received while presenting the media stream at a selected media stream at a current media stream location; and
invoking the second media graph further comprises: invoking the second media graph to continue presenting the media stream from the current media stream location using the second media stream property.

* * * * *